US012789986B2

(12) United States Patent
Piippo et al.

(10) Patent No.: US 12,789,986 B2
(45) Date of Patent: Nov. 10, 2026

(54) VEHICLES EQUIPPED WITH AN ELECTRIC MOTOR INCLUDING AN OPEN CENTRAL REGION CONFIGURED TO ENABLE RELEASE AND/OR OPERATION OF A DEVICE FROM WITHIN THE ELECTRIC MOTOR

(71) Applicant: Donut Lab Development Ou, Harju maakond (EE)

(72) Inventors: Ville Piippo, Haarajoki (FI); Marko Lehtimäki, Hyllykallio (FI); Tuomo Lehtimäki, Monaco (MC); Tero Ohranen, Tallinn (EE); Antti Alasalmi, Seinäjoki (FI); Harri Yli-Kujala, Helsinki (FI)

( * ) Notice: Subject to any disclaimer, the term of this patent is extended or adjusted under 35 U.S.C. 154(b) by 0 days.

(21) Appl. No.: 19/274,765

(22) Filed: Jul. 21, 2025

(65) Prior Publication Data

US 2026/0138738 A1 May 21, 2026

Related U.S. Application Data

(60) Provisional application No. 63/722,219, filed on Nov. 19, 2024.

(51) Int. Cl.
*B64C 27/473* (2006.01)
*B63B 39/06* (2006.01)
(Continued)

(52) U.S. Cl.
CPC ............ *B64C 27/473* (2013.01); *B63B 39/06* (2013.01); *B63H 1/26* (2013.01); *B63H 21/17* (2013.01); *B63H 25/38* (2013.01); *B64D 33/08* (2013.01)

(58) Field of Classification Search
CPC .............................. B64D 33/08; B64C 27/473
See application file for complete search history.

(56) References Cited

U.S. PATENT DOCUMENTS 2,396,598 A * 3/1946 Ramshorn ............... F01P 7/023 123/41.58
3,606,209 A * 9/1971 Rosta et al. ............ B64C 27/20 244/23 C
(Continued)

FOREIGN PATENT DOCUMENTS

CN 114872884 A 8/2022
CN 107226209 B 12/2023
(Continued)

OTHER PUBLICATIONS

International Searching Authority, "Invitation to Pay Additional Fees, Partial International Search Report, and Written Opinion of the International Searching Authority," issued in connection with International Patent Application No. PCT/EP2025/076834, dated Nov. 25, 2025, 14 pages.
(Continued)

*Primary Examiner* — William L Gmoser
(74) *Attorney, Agent, or Firm* — Avantech Law, LLP

(57) ABSTRACT

Rotor assemblies for a rotor-based aerial vehicles are described. An example rotor assembly comprises an electric motor including a stator, a rotor, and an open central region. The rotor is configured to rotate relative to the stator. The open central region is located radially inward relative to the stator. The example rotor assembly further comprises a plurality of rotor blades operatively coupled to the rotor. The example rotor assembly further comprises a device deployable from a stowed position relative to the electric motor into a deployed position relative to the electric motor. At least a portion of the device is located within the open central region when the device is in the stowed position. The at least a portion of the device is located above the electric motor and above the plurality of rotor blades when the device is in the deployed position.

17 Claims, 7 Drawing Sheets

(51) Int. Cl.

| | |
|---|---|
| ***B63H 1/26*** | (2006.01) |
| ***B63H 21/17*** | (2006.01) |
| ***B63H 25/38*** | (2006.01) |
| ***B64D 33/08*** | (2006.01) |

(56) References Cited

U.S. PATENT DOCUMENTS

| | | | | |
|---|---|---|---|---|
| 9,613,539 | B1 * | 4/2017 | Lindskog | H02K 7/183 |
| 9,938,001 | B1 * | 4/2018 | Parent | B64U 10/10 |
| 10,096,255 | B1 | 10/2018 | Lindskog et al. | |
| 11,487,283 | B1 | 11/2022 | Chasen et al. | |
| 11,685,543 | B1 * | 6/2023 | Joshi | B64D 33/08<br>415/177 |
| 11,975,871 | B2 | 5/2024 | Martel | |
| 12,151,825 | B2 * | 11/2024 | Valembois | B64C 1/16 |
| 12,187,450 | B1 * | 1/2025 | Roller | B64U 50/19 |
| 12,510,084 | B1 * | 12/2025 | Kim | B64D 35/026 |
| 2009/0212157 | A1 | 8/2009 | Arlton et al. | |
| 2021/0036580 | A1 * | 2/2021 | Cottrell | B64U 10/13 |
| 2022/0185452 | A1 * | 6/2022 | Saber | B64C 11/001 |

FOREIGN PATENT DOCUMENTS

| | | | |
|---|---|---|---|
| DE | 102014205829 | A1 | 10/2015 |
| EP | 1985536 | B1 | 2/2012 |

OTHER PUBLICATIONS

International Searching Authority, “International Search Report and Written Opinion of the International Searching Authority,” issued in connection with International Patent Application No. PCT/EP2025/076834, dated Feb. 2, 2026, 19 pages.

* cited by examiner

VEHICLES EQUIPPED WITH AN ELECTRIC MOTOR INCLUDING AN OPEN CENTRAL REGION CONFIGURED TO ENABLE RELEASE AND/OR OPERATION OF A DEVICE FROM WITHIN THE ELECTRIC MOTOR

RELATED APPLICATIONS

This application claims priority to U.S. Provisional Patent Application No. 63/722,219, filed Nov. 19, 2024. The entirety of U.S. Provisional Patent Application No. 63/722,219 is hereby incorporated by reference herein.

FIELD OF THE DISCLOSURE

This disclosure relates generally to electric motors and, more specifically, to vehicles equipped with an electric motor including an open central region configured to enable release and/or operation of one or more device(s) from within the electric motor.

BACKGROUND

Electric motors typically include a stator and a rotor, with the rotor being configured to rotate relative to the stator. The stator and the rotor can be implemented in either an inner rotor configuration in which the stator circumscribes the rotor, or conversely in an outer rotor configuration in which the rotor circumscribes the stator. Electric motors are widely used across multiple industries (e.g., automotive, medical, household, etc.) and a variety of applications including vehicles, appliances, tools, fans, blowers, turbines, compressors, pumps, etc.

Electric vehicles have risen in popularity over the past decade. Electric vehicles are typically powered by one or more electric motor(s) that draw(s) electricity from an onboard rechargeable battery. Electric vehicles exist in many forms including, for example, wheeled electric vehicles configured for use and/or operation on land (e.g., cars, trucks, motorcycles, scooters, etc.), aerial electric vehicles configured for use and/or operation in the air (e.g., drones, helicopters, fixed-wing aircraft, etc.), and marine electric vehicles configured for use and/or operation in and/or under water (e.g., boats, submarines, etc.).

Figure 1:
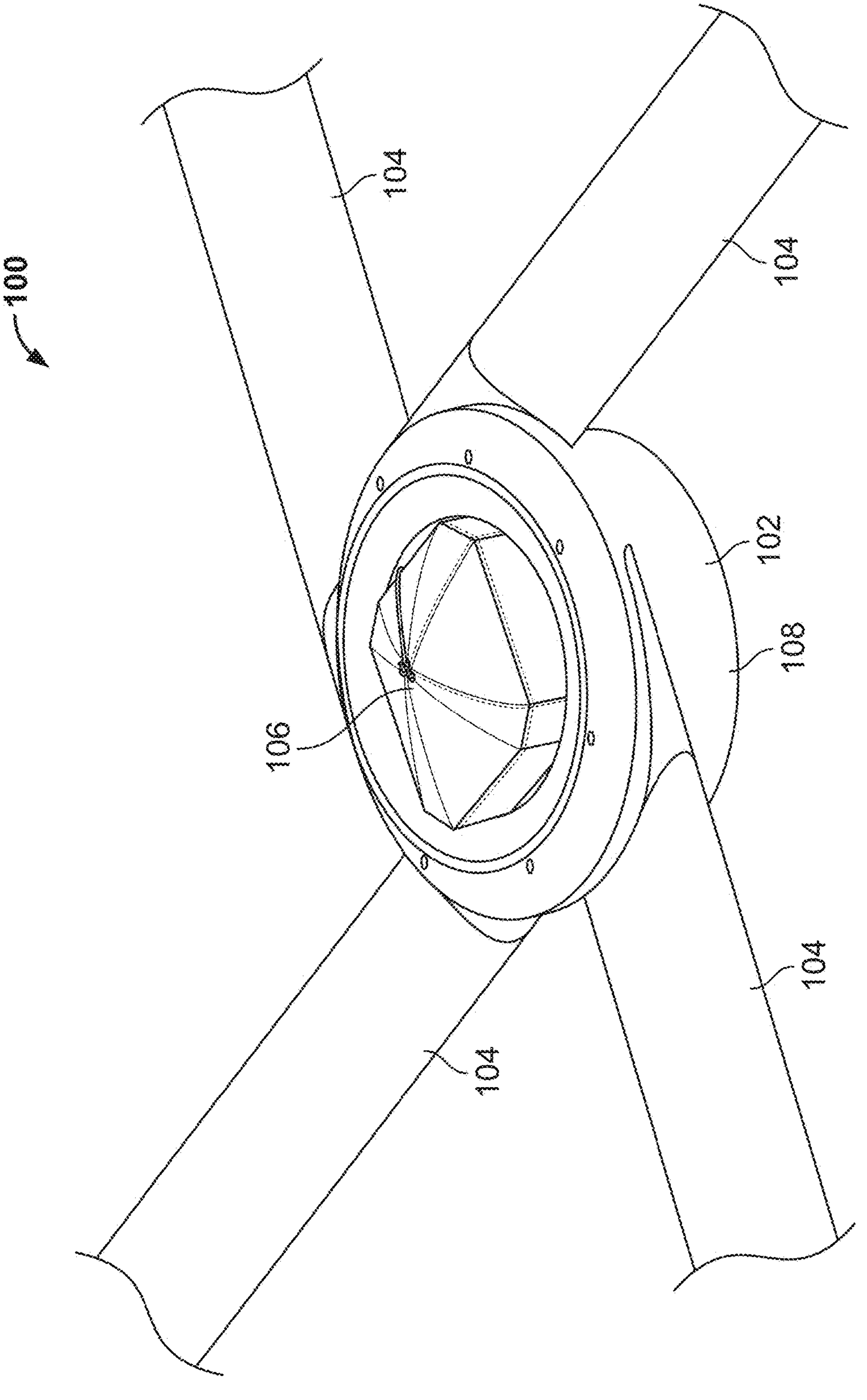
FIG. 1 is a perspective view of an example rotor assembly including an example electric motor, a plurality of example rotor blades, and an example parachute, with the parachute shown in a stowed position relative to the electric motor.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Rotor-based aerial vehicles (e.g., drones, helicopters, etc.) are typically equipped with one or more rotor(s) having a plurality of rotor blades attached thereto. When the rotor is rotated, the rotor blades generate lift that facilitates flight of the aerial vehicle. In some examples, the operation of the rotor is facilitated via a complex transmission assembly that is operatively coupled to the rotor, with the transmission assembly being powered by an engine of the aerial vehicle. In other examples, the operation of the rotor is facilitated via an electric motor that is operatively coupled to the rotor of the aerial vehicle.

Absent a dedicated enclosure and an associated operational system mounted above the rotor, aerial vehicles having a single-rotor implementation are unable to operate and/or release devices to be used above the aerial vehicle, as the rotating rotor blades would otherwise destroy any such devices. While a dedicated enclosures and an associated operational systems mounted above the rotor can facilitate the operation and/or release of a device above a single-rotor aerial vehicle, the incorporation of such structures into the aerial vehicle typically imposes negative side effects for the aerial vehicle as a whole. For example, mounting a dedicated enclosure and an associated operational system above the rotor causes the physical dimensions of the aerial vehicle to increase by a substantial amount, and also increases the weight of the aerial vehicle. As another example, mounting a dedicated enclosure and an associated operational system above the rotor causes a sub-optimal distribution of weight for the aerial vehicle, including a significant portion of the weight being undesirably located above the propellers of the rotor. As another example, mounting a dedicated enclosure and an associated operational system above the rotor causes disruptions to the airflow around the rotor, with such disruptions having a negative impact on energy efficiency, fuel efficiency, and flight time associated with the aerial vehicle.

Example rotor assemblies disclosed herein are advantageously configured to release and/or to operate one or more device(s) from an open central region (e.g., a hollow center) of an electric motor of the rotor assembly. In some disclosed examples, the device is implemented as a parachute that can be stowed (e.g., packed) within the open central region of the electric motor of the rotor assembly until use (e.g., deployment) of the parachute becomes necessary and/or becomes desired. For example, if an emergency landing of an aerial vehicle incorporating the rotor assembly becomes necessary, the parachute of the rotor assembly can be deployed from the open central region of the electric motor to an area located above the electric motor and/or above the rotor blades.

Parachute-based implementations such as those described above are also advantageous for applications having a mission profile that requires vertical takeoff (e.g., from a ground reference point or some other launch zone or base) until a very high altitude is reached, followed by a parachute-assisted return (e.g., to ground or some other landing zone or base). For example, an aerial vehicle tasked with a mission profile that requires launching to an altitude of several kilometers would require a substantial amount of energy and a very light weight. Such an aerial vehicle would benefit from a capability to expend energy only during launch, and to have an energy-reduced (e.g., zero energy) parachute-assisted return.

In other disclosed examples, the device located within the open central region of the electric motor is implemented as a rotor blade control assembly including a control shaft that extends through the open central region of the electric motor, with the control shaft being operatively coupled to a plurality of rotor blades via a corresponding plurality of control arms. The control shaft is configured to move along an axial direction relative to the rotor of the electric motor. Movement of the control shaft along the axial direction causes a pivotal movement of each one of the rotor blades relative to the rotor of the electric motor. The angle of each one of the rotor blades is accordingly adjustable and/or controllable via the control shaft. The ability of the disclosed rotor blade control assembly to adjust and/or control the angle of each one of the rotor blades advantageously enables the rotor blade control assembly to adjust and/or control various flight-related aerodynamic characteristics (e.g., lift, thrust, angle of attack, pitch angle, etc.) associated with the rotor blades.

In the absence of the open central region provided by the electric motor, the control shaft of the rotor blade control assembly and/or one or more alternative structure(s) would need to instead be routed externally relative to the electric motor in order to facilitate adjustment of the angle of the rotor blades. Such an arrangement would increase drag, which would in turn decrease the efficiency of the aerial vehicle. Such an arrangement would also expose the control shaft and/or the alternative structure(s) to dirt from the surrounding environment, thereby increasing the likelihood of failure for such components. The disclosed rotor blade control assembly accordingly provides numerous benefits that are directly attributable to the open central region provided by the electric motor.

As used herein, the term "electric machine(s)" encompasses electric motor(s) configured to transform electrical energy into mechanical energy, and further encompasses electric generator(s) configured to transform mechanical energy into electrical energy.

As used herein in a mechanical context, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts at the point (or points) of contact between the two parts.

As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein, the term "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
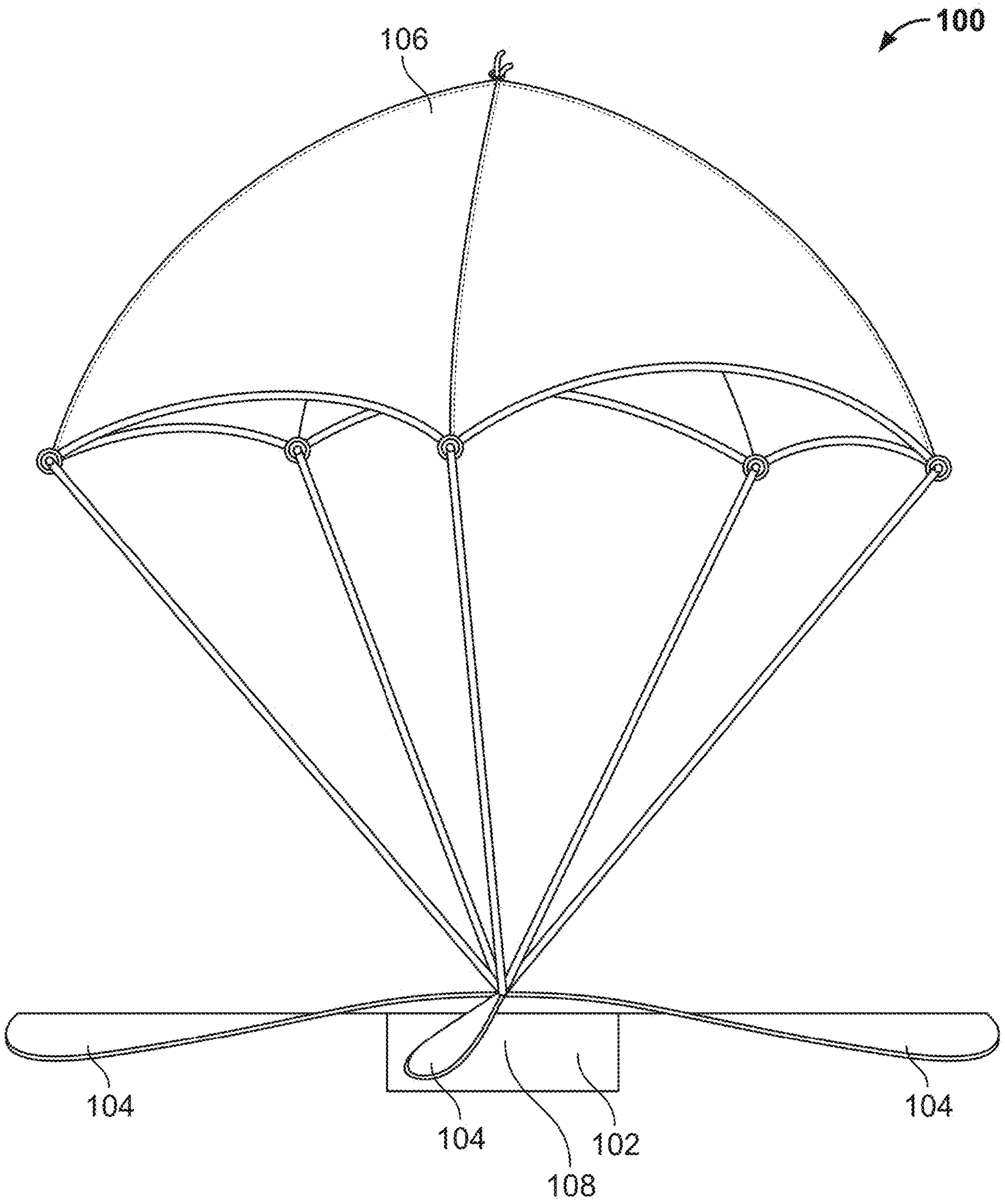
FIG. 2 is a side view of the rotor assembly of FIG. 1, with the parachute shown in a deployed position relative to the electric motor.

FIG. 1 is a perspective view of an example rotor assembly 100 including an example electric motor 102, a plurality of example rotor blades 104, and an example parachute 106, with the parachute 106 shown in a stowed position relative to the electric motor 102. FIG. 2 is a side view of the rotor assembly 100 of FIG. 1, with the parachute 106 shown in a deployed position relative to the electric motor 102. The rotor assembly 100 of FIGS. 1 and 2 is suitable for implementation in various types of rotor-based aerial vehicles (e.g., drones, helicopters, etc.).

In the illustrated example of FIGS. 1 and 2, the electric motor 102 of the rotor assembly 100 includes an example stator and an example rotor 108, with the rotor 108 being configured to rotate relative to the stator. Respective ones of the rotor blades 104 of the rotor assembly 100 are operatively coupled (e.g., mechanically mounted) to the rotor 108 of the electric motor 102. In the illustrated example of FIGS. 1 and 2, the electric motor 102 of the rotor assembly 100 is configured as an outer-rotor electric motor in which the stator and the rotor 108 of the electric motor 102 are arranged such that the rotor 108 circumscribes the stator. In other examples, the electric motor 102 of the rotor assembly 100 can instead be configured as an inner-rotor electric motor in which the stator and the rotor 108 of the electric motor 102 are arranged such that the stator circumscribes the rotor 108.

Regardless of its specific configuration (e.g., outer-rotor versus inner-rotor), the electric motor 102 of the rotor assembly 100 includes an open central region (e.g., a hollow center) that is located radially inward relative to the stator and/or relative to the rotor 108. In the illustrated example of FIGS. 1 and 2, the parachute 106 of the rotor assembly 100 can be stowed (e.g., packed) within the open central region of the electric motor 102 (e.g., as shown in FIG. 1) until use (e.g., deployment) of the parachute 106 becomes necessary and/or becomes desired. For example, if an emergency landing of an aerial vehicle incorporating the rotor assembly 100 becomes necessary, the parachute 106 of the rotor assembly 100 can be deployed from the open central region of the electric motor 102 to an area located above the electric motor 102 and/or above the rotor blades 104 (e.g., as shown in FIG. 2). Deploying (e.g., releasing and/or operating) the parachute 106 to a location above the electric motor 102 and/or above the rotor blades 104 advantageously enables the parachute 106 to be used for its intended purpose without concern over the parachute 106 becoming entangled with and/or damaged by the rotor blades 104 of the rotor assembly 100. In some examples, deployment of the parachute 106 occurs in response to and/or is otherwise initiated by user interaction with a control mechanism (e.g., a switch, a button, a lever, a voice command, etc.) associated with the parachute 106. In other examples, deployment of the parachute 106 instead occurs in a fully-automated manner in response to a detected flight condition (e.g., a change in altitude, a change in angle of attack, a loss or power to the electric motor 102, etc.).

While the example shown in FIGS. 1 and 2 expressly illustrates the incorporation of a parachute 106 into the rotor assembly 100, many other types of devices can be deployed from, released from, and/or operated from within the open central region of the electric motor 102 of the rotor assembly 100. Such other devices can include a cooling assembly, a rotor blade control assembly, a camera, a radar system, a weather balloon, any number and/or type of measurement and/or sensor device, a thermal masking assembly (e.g., an exhaust conduit configured to release gas that manipulates a heat print of the aerial vehicle visible to thermal devices), a weapon system (e.g., a gun, a cannon, a projectile launcher, a rocket, a missile, etc.), and/or various measurement/sensing devices, among others.

Figure 3:
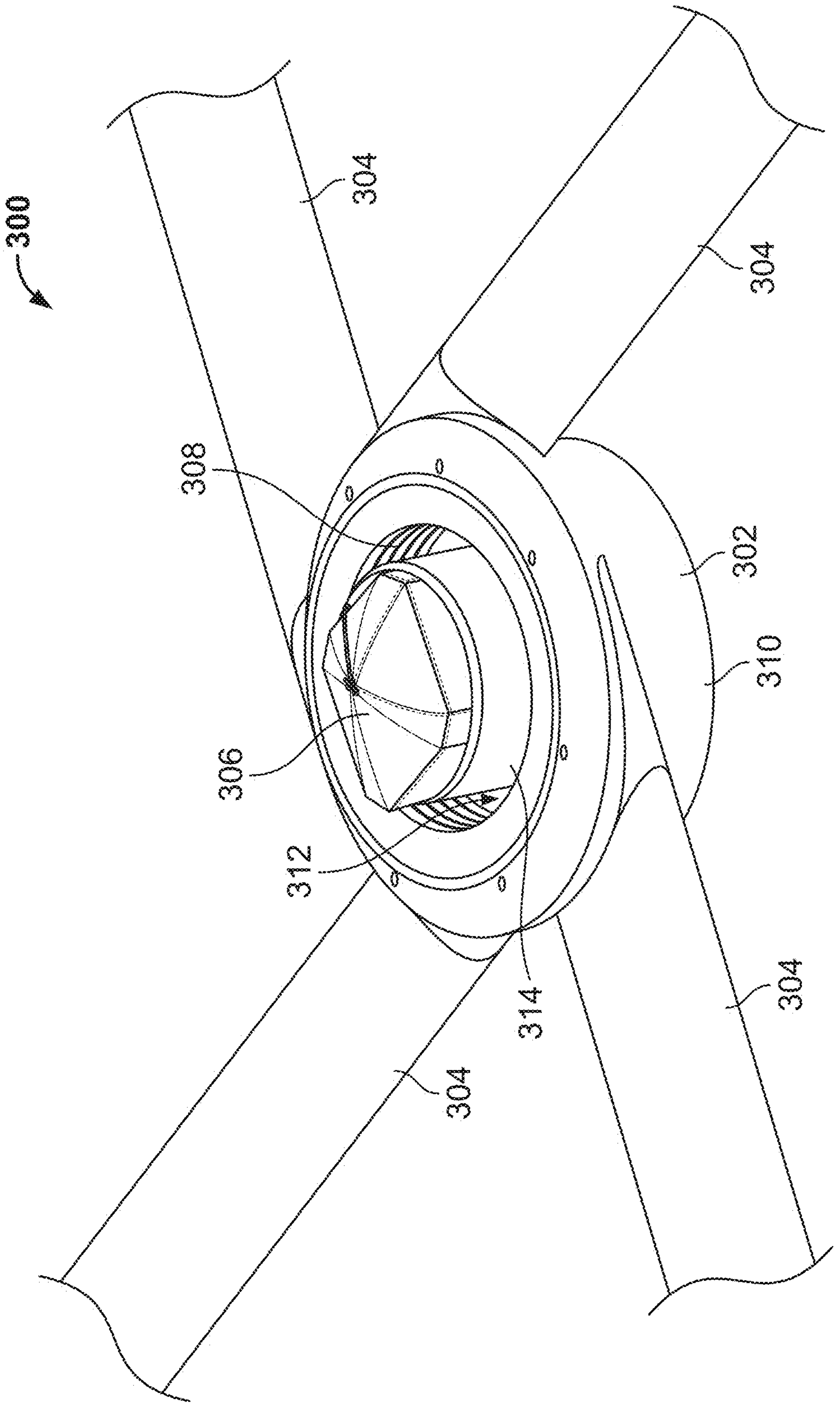
FIG. 3 is a perspective view of an example rotor assembly including an example electric motor, a plurality of example rotor blades, and an example parachute, with the parachute shown in a stowed position relative to the electric motor.
Figure 4:
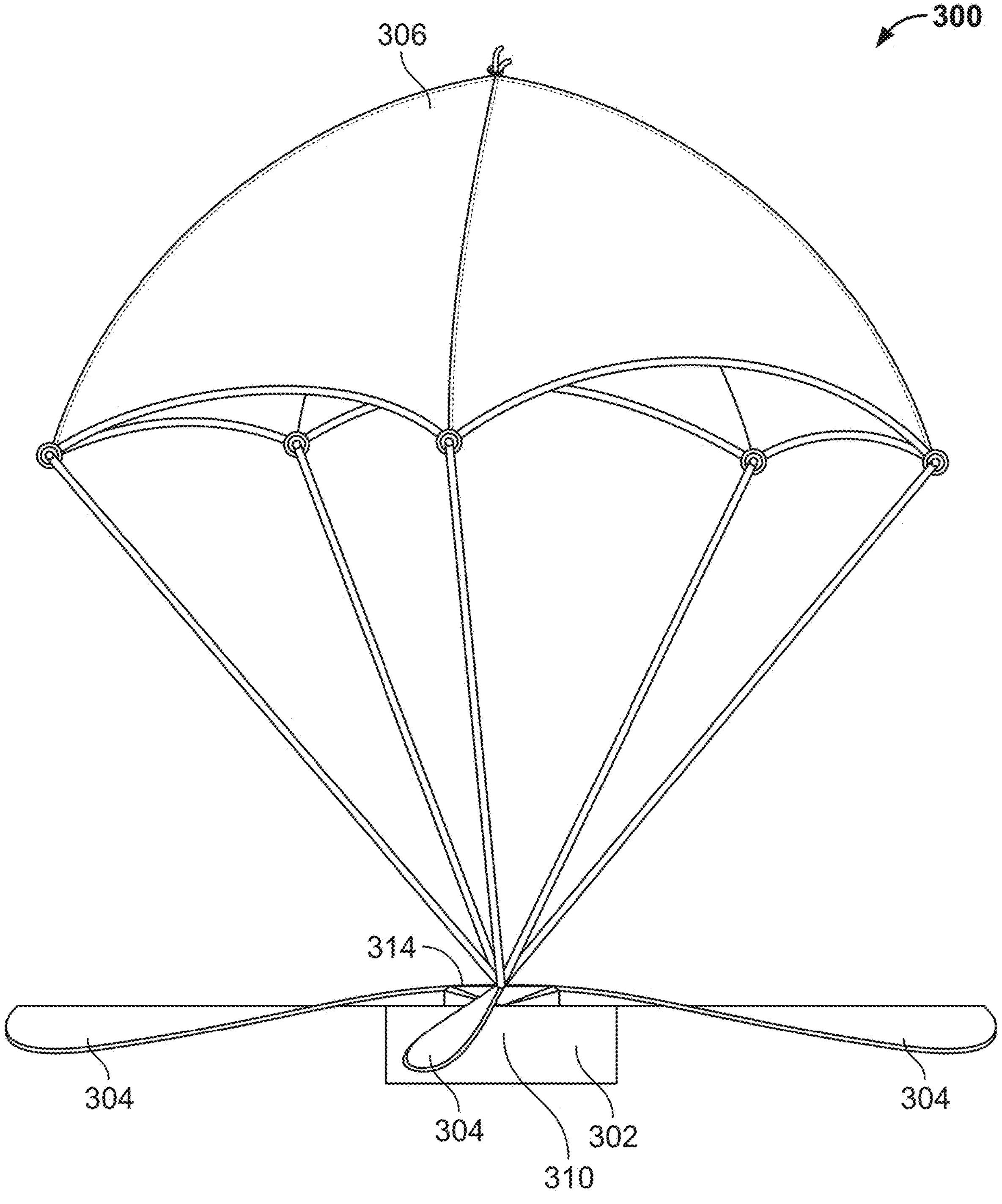
FIG. 4 is a side view of the rotor assembly of FIG. 3, with the parachute shown in a deployed position relative to the electric motor.

FIG. 3 is a perspective view of an example rotor assembly 300 including an example electric motor 302, a plurality of example rotor blades 304, and an example parachute 306, with the parachute 306 shown in a stowed position relative to the electric motor 302. FIG. 4 is a side view of the rotor assembly 300 of FIG. 3, with the parachute 306 shown in a deployed position relative to the electric motor 302. The rotor assembly 300 of FIGS. 3 and 4 is suitable for implementation in various types of rotor-based aerial vehicles (e.g., drones, helicopters, etc.).

In the illustrated example of FIGS. 3 and 4, the electric motor 302 of the rotor assembly 300 includes an example stator 308 an example rotor 310, with the rotor 310 being configured to rotate relative to the stator 308. Respective ones of the rotor blades 304 of the rotor assembly 300 are operatively coupled (e.g., mechanically mounted) to the rotor 310 of the electric motor 302. In the illustrated example of FIGS. 3 and 4, the electric motor 302 of the rotor assembly 300 is configured as an outer-rotor electric motor in which the stator 308 and the rotor 310 of the electric motor 302 are arranged such that the rotor 310 circumscribes the stator 308. In other examples, the electric motor 302 of the rotor assembly 300 can instead be configured as an inner-rotor electric motor in which the stator 308 and the rotor 310 of the electric motor 302 are arranged such that the stator 308 circumscribes the rotor 310.

Regardless of its specific configuration (e.g., outer-rotor versus inner-rotor), the electric motor 302 of the rotor assembly 300 includes an example open central region 312 (e.g., a hollow center) that is located radially inward relative to the stator 308 and/or relative to the rotor 310. In the illustrated example of FIGS. 3 and 4, the parachute 306 of the rotor assembly 300 is stowed (e.g., packed) within an example container 314 that is located within the open central region 312 of the electric motor 302 (e.g., as shown in FIG. 3) until use (e.g., deployment) of the parachute 306 becomes necessary and/or becomes desired. For example, if an emergency landing of an aerial vehicle incorporating the rotor assembly 300 becomes necessary, the parachute 306 of the rotor assembly 300 can be deployed from the container 314 located within the open central region 312 of the electric motor 302 to an area located above the electric motor 302 and/or above the rotor blades 304 (e.g., as shown in FIG. 4). Deploying (e.g., releasing and/or operating) the parachute 306 to a location above the electric motor 302 and/or above the rotor blades 304 advantageously enables the parachute 306 to be used for its intended purpose without concern over the parachute 306 becoming entangled with and/or damaged by the rotor blades 304 of the rotor assembly 300. In some examples, deployment of the parachute 306 occurs in response to and/or is otherwise initiated by user interaction with a control mechanism (e.g., a switch, a button, a lever, a voice command, etc.) associated with the parachute 306. In other examples, deployment of the parachute 306 instead occurs in a fully-automated manner in response to a detected flight condition (e.g., a change in altitude, a change in angle of attack, a loss or power to the electric motor 302, etc.).

In the illustrated example of FIGS. 3 and 4, an exterior surface of the container 314 is spaced radially inward from an interior surface of the stator 308 and/or an interior surface of the rotor 310 of the electric motor 302 such that an air gap exists therebetween. The presence of the air gap advantageously assists with cooling the electric motor 302 during operation and/or use thereof. In other examples, one or more other cooling assemblies (e.g., a fluid-based cooling assembly) configured to cool the electric motor 302 during operation and/or use thereof can be incorporated into the stator 308 of the electric motor 302, or alternatively can be located within the open central region 312 of the electric motor 302.

While the example shown in FIGS. 3 and 4 expressly illustrates the incorporation of a parachute 306 into the rotor assembly 300, many other types of devices can be deployed from, released from, and/or operated from within the open central region 312 of the electric motor 302 of the rotor assembly 300. Such other devices can include a cooling assembly, a rotor blade control assembly, a camera, a radar system, a weather balloon, any number and/or type of measurement and/or sensor device, a thermal masking assembly (e.g., an exhaust conduit configured to release gas that manipulates a heat print of the aerial vehicle visible to thermal devices), a weapon system (e.g., a gun, a cannon, a projectile launcher, a rocket, a missile, etc.), and/or various measurement/sensing devices, among others.

Figure 5:
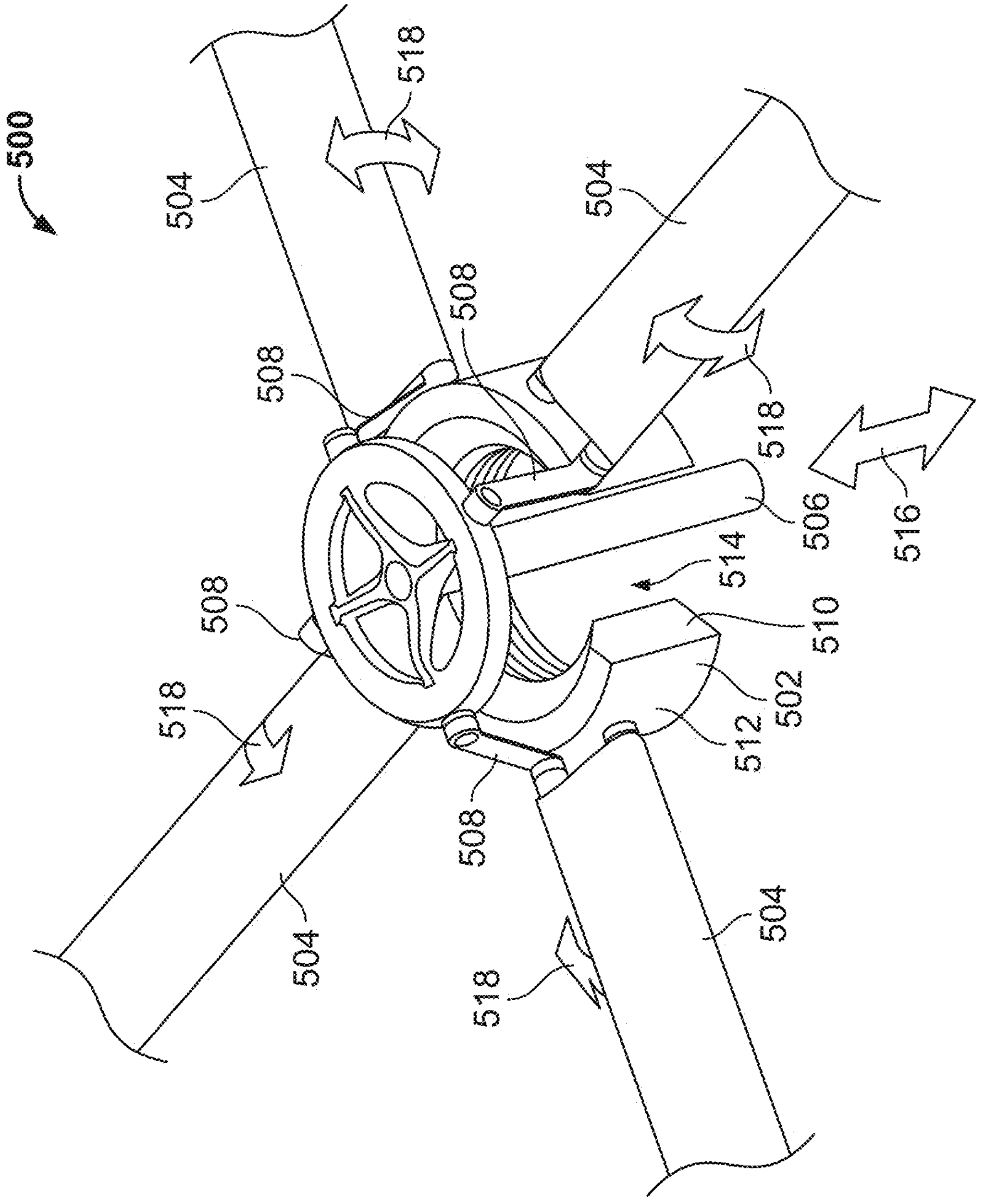
FIG. 5 is a partial cutaway perspective view of an example rotor assembly including an example electric motor, a plurality of example rotor blades, an example control shaft, and a plurality of example control arms.

FIG. 5 is a partial cutaway perspective view of an example rotor assembly 500 including an example electric motor 502, a plurality of example rotor blades 504, an example control shaft 506, and a plurality of example control arms 508. The rotor assembly 500 of FIG. 5 is suitable for implementation in various types of rotor-based aerial vehicles (e.g., drones, helicopters, etc.). In the illustrated example of FIG. 5, the electric motor 502 of the rotor assembly 500 includes an example stator 510 and an example rotor 512, with the rotor 512 being configured to rotate relative to the stator 510. Respective ones of the rotor blades 504 of the rotor assembly 500 are operatively coupled (e.g., mechanically mounted) to the rotor 512 of the electric motor 502, with each one of the rotor blades 504 being pivotable relative to the rotor 512. In the illustrated example of FIG. 5, the electric motor 502 of the rotor assembly 500 is configured as an outer-rotor electric motor in which the stator 510 and the rotor 512 of the electric motor 502 are arranged such that the rotor 512 circumscribes the stator 510. In other examples, the electric motor 502 of the rotor assembly 500 can instead be configured as an inner-rotor electric motor in which the stator 510 and the rotor 512 of the electric motor 502 are arranged such that the stator 510 circumscribes the rotor 512.

Regardless of its specific configuration (e.g., outer-rotor versus inner-rotor), the electric motor 502 of the rotor assembly 500 of FIG. 5 includes an example open central region 514 (e.g., a hollow center) that is located radially inward relative to the stator 510 and/or relative to the rotor 512. In the illustrated example of FIG. 5, the control shaft 506 of the rotor assembly 500 extends through the open central region 514 of the electric motor 502, with the control shaft 506 being configured to move along an example axial direction 516 relative to the rotor 512 of the electric motor 502. As further shown in FIG. 5, respective ones of the control arms 508 of the rotor assembly 500 are operatively coupled to and extend between the control shaft 506 of the rotor assembly 500 and corresponding respective ones of the rotor blades 504 of the rotor assembly 500. Movement of the control shaft 506 along the axial direction 516 relative to the rotor 512 of the electric motor 502 causes an example pivotal movement 518 of each one of the rotor blades 504 relative to the rotor 512 of the electric motor 502, as generally indicated in FIG. 5. The angle of each one of the rotor blades 504 relative to the rotor 512 of the electric motor 502 is accordingly adjustable and/or controllable via the control shaft 506. The ability of the rotor assembly 500 to adjust and/or control the angle of each one of the rotor blades 504 relative to the rotor 512 of the electric motor 502 advantageously enables the rotor assembly 500 to adjust and/or control various flight-related aerodynamic characteristics (e.g., lift, thrust, angle of attack, pitch angle, etc.) associated with the rotor blades 504.

In the absence of the open central region 514 provided by the electric motor 502 of the rotor assembly 500 of FIG. 5, the control shaft 506 and/or one or more alternative structure(s) would need to instead be routed externally relative to the electric motor 502 in order to implement a rotor blade control assembly that facilitates adjustment of the angle of the rotor blades 504. Such an arrangement would increase drag, which would in turn decrease the efficiency of the aerial vehicle. Such an arrangement would also expose the control shaft 506 and/or the alternative structure(s) to dirt from the surrounding environment, thereby increasing the likelihood of failure for such components. The rotor assembly 500 of FIG. 5 accordingly provides numerous benefits that are directly attributable to the open central region 514 provided by the electric motor 502.

Figure 6:
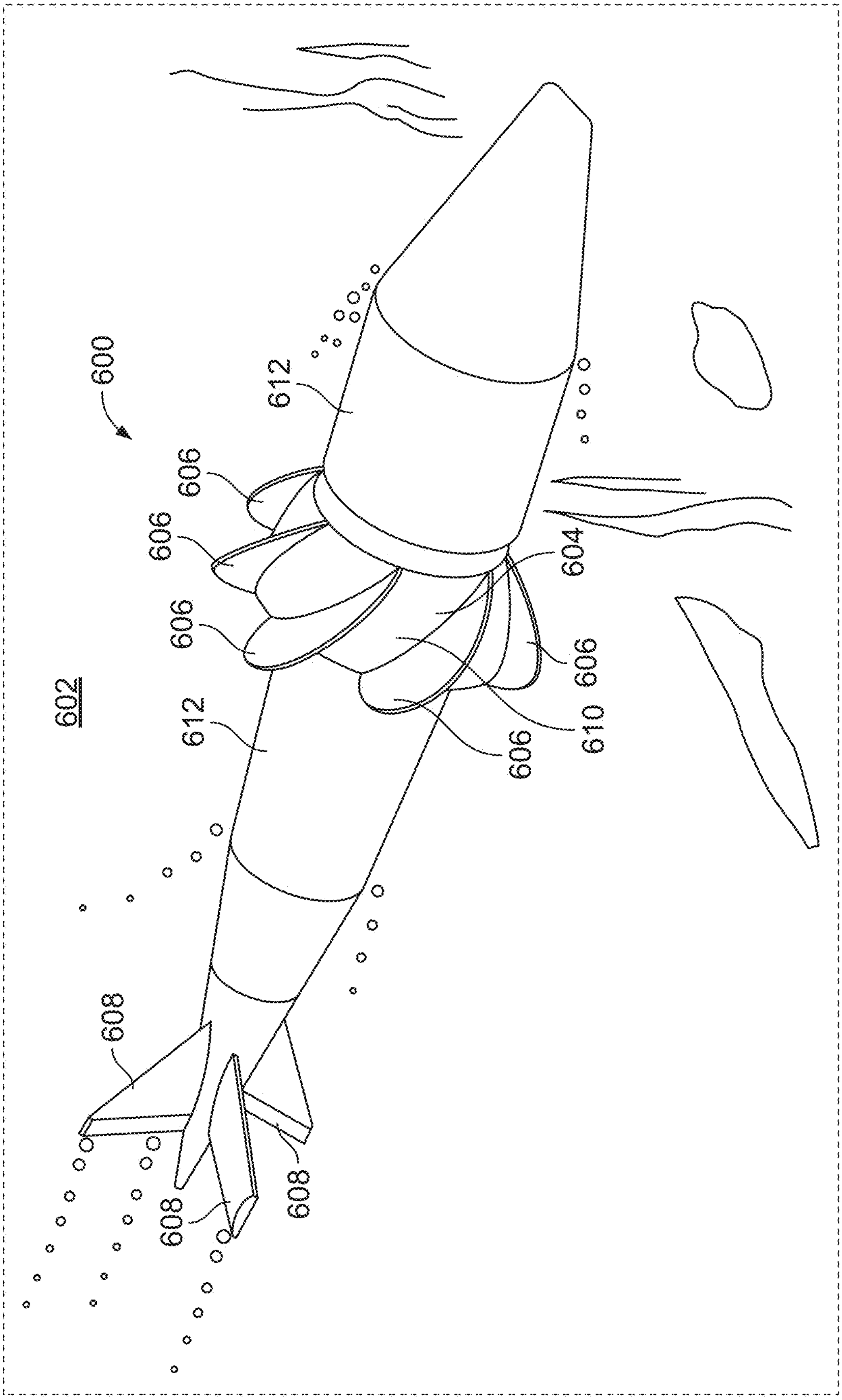
FIG. 6 is a perspective view of an example marine vessel submerged in an example underwater environment, with the marine vessel including an example electric motor, a plurality of example propeller blades, and a plurality of example tail fins.

While the examples shown in FIGS. 1-5 expressly illustrate rotor assemblies that are configured for use with aerial vehicles, the electric motors of such rotor assemblies can similarly be configured for use with (e.g., incorporated into) other types of vehicles (e.g., marine vessels having propellers or rotors, fixed-wing aircraft having propellers, etc.). For example, FIG. 6 is a perspective view of an example marine vessel 600 (e.g., a submarine) submerged in an example underwater environment 602. The marine vessel 600 of FIG. 6 includes an example electric motor 604, a plurality of example propeller blades 606, and a plurality of example tail fins 608. In the illustrated example of FIG. 6, the electric motor 604 of the marine vessel 600 includes an example stator and an example rotor 610, with the rotor 610 being configured to rotate relative to the stator. Respective ones of the propeller blades 606 of the marine vessel 600 are operatively coupled (e.g., mechanically mounted) to the rotor 610 of the electric motor 604.

The electric motor 604 of the marine vessel 600 of FIG. 6 is configured as an outer-rotor electric motor in which the stator and the rotor 610 of the electric motor 604 are arranged such that the rotor 610 circumscribes the stator. In the illustrated example of FIG. 6, an exterior surface of the rotor 610 of the electric motor 604 is substantially flush with an exterior surface of the surrounding portion of an example longitudinal body 612 of the marine vessel 600. The propeller blades 606 of the marine vessel 600 extend radially outward from the exterior surface of the rotor 610 of the electric motor 604, and also project radially outward relative to the surrounding portion of the exterior surface of the longitudinal body 612 of the marine vessel 600. Rotational movement of the rotor 610 of the electric motor 604 causes a corresponding rotational movement of the propeller blades 606, thereby causing the marine vessel 600 as a whole to be axially propelled in either a forward or rearward direction. The tail fins 608 of the marine vessel 600 assist with stability and control of the marine vessel 600 as the marine vessel 600 is axially propelled by the propeller blades 606 within the underwater environment 602.

Much like the electric motor 502 of the rotor assembly 500 of FIG. 5 described above, the electric motor 604 of the marine vessel 600 of FIG. 6 includes an open central region (e.g., a hollow center) that is located radially inward relative to the stator and/or relative to the rotor 610. One or more device(s) and/or component(s) of the marine vessel 600 can be located within, extend into, extend from, and/or extend through the open central region of the electric motor 604, thereby advantageously reducing the footprint of the marine vessel 600 as a whole. Such device(s) and/or component(s) are operable and/or usable from their respective position(s) within the open central region of the electric motor 604, and remain so even while the rotor 610 of the electric motor 604 is rotating (e.g., while the marine vessel 600 is being propelled through the underwater environment 602 via the propeller blades 606).

Figure 7:
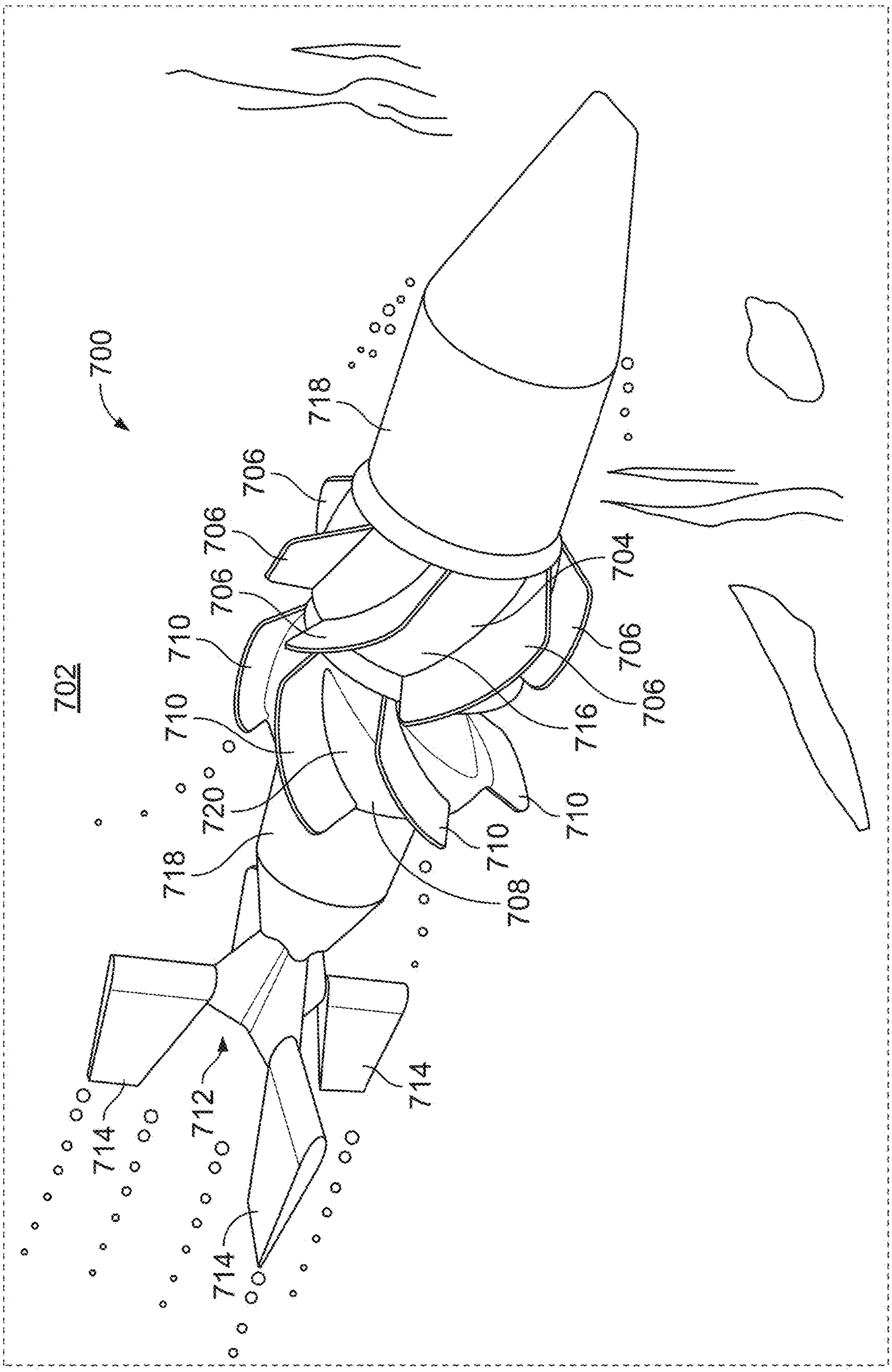
FIG. 7 is a perspective view of an example marine vessel submerged in an example underwater environment, with the marine vessel including an example first electric motor having a plurality of example first propeller blades, an example second electric motor having a plurality of example second propeller blades, and an example tail rudder having a plurality of example adjustable fins.

FIG. 7 is a perspective view of an example marine vessel 700 submerged in an example underwater environment 702, with the marine vessel 700 including an example first electric motor 704 having a plurality of example first propeller blades 706, an example second electric motor 708 having a plurality of example second propeller blades 710, and an example tail rudder 712 having a plurality of example adjustable fins 714.

The first electric motor 704 of the marine vessel 700 of FIG. 7 includes an example stator and an example rotor 716, with the rotor 716 being configured to rotate relative to the stator. Respective ones of the first propeller blades 706 of the marine vessel 700 are operatively coupled (e.g., mechanically mounted) to the rotor 716 of the first electric motor 704. The first electric motor 704 of the marine vessel 700 of FIG. 7 is configured as an outer-rotor electric motor in which the stator and the rotor 716 of the first electric motor 704 are arranged such that the rotor 716 circumscribes the stator. In the illustrated example of FIG. 7, an exterior surface of the rotor 716 of the first electric motor 704 is generally flush with an exterior surface of the surrounding portion of an example longitudinal body 718 of the marine vessel 700. The first propeller blades 706 of the marine vessel 700 extend radially outward from the exterior surface of the rotor 716 of the first electric motor 704, and also project radially outward relative to the surrounding portion of the exterior surface of the longitudinal body 718 of the marine vessel 700. Rotational movement of the rotor 716 of the first electric motor 704 causes a corresponding rotational movement of the first propeller blades 706 of the marine vessel 700.

The second electric motor 708 of the marine vessel 700 of FIG. 7 includes an example stator and an example rotor 720, with the rotor 720 being configured to rotate relative to the stator. Respective ones of the second propeller blades 710 of the marine vessel 700 are operatively coupled (e.g., mechanically mounted) to the rotor 720 of the second electric motor 708. The second electric motor 708 of the marine vessel 700 of FIG. 7 is configured as an outer-rotor electric motor in which the stator and the rotor 720 of the second electric motor 708 are arranged such that the rotor 720 circumscribes the stator. In the illustrated example of FIG. 7, an exterior surface of the rotor 720 of the second electric motor 708 is generally flush with an exterior surface of the surrounding portion of an example longitudinal body 718 of the marine vessel 700. The second propeller blades 710 of the marine vessel 700 extend radially outward from the exterior surface of the rotor 720 of the second electric motor 708, and also project radially outward relative to the surrounding portion of the exterior surface of the longitudinal body 718 of the marine vessel 700. Rotational movement of the rotor 720 of the second electric motor 708 causes a corresponding rotational movement of the second propeller blades 710 of the marine vessel 700.

In the illustrated example of FIG. 7, the second electric motor 708 is axially spaced apart from the first electric motor 704 along the longitudinal body 718 of the marine vessel 700. The first electric motor 704 and the second electric motor 708 of the marine vessel 400 are independently operable and/or independently controllable. Rotational movement of the rotor 716 of the first electric motor 704 (e.g., including the first propeller blades 706 attached thereto) and/or rotational movement of the rotor 720 of the second electric motor 708 (e.g., including the second propeller blades 710 attached thereto) causes the marine vessel 700 as a whole to be axially propelled in either a forward or rearward direction. The tail rudder 712 of the marine vessel 700 assists with stability and control of the marine vessel 700 as the marine vessel 700 is axially propelled by the first propeller blades 706 and/or the second propeller blades 710 within the underwater environment 702. In this regard, the position of each one of the adjustable fins 714 of the tail rudder 712 can be adjusted and/or controlled to enhance navigational movement and/or navigational control of the marine vessel 700 as the marine vessel 700 travels within the underwater environment 702.

Much like the electric motor 502 of the rotor assembly 500 of FIG. 5 described above, the first electric motor 704 and the second electric motor 708 of the marine vessel 700 of FIG. 7 respectively include an open central region (e.g., a hollow center) that is located radially inward relative to the stator and/or relative to the rotor of each electric motor. One or more device(s) and/or component(s) of the marine vessel 700 can be located within, extend into, extend from, and/or extend through the open central region of the first electric motor 704 and/or the open central region of the second electric motor 708, thereby advantageously reducing the footprint of the marine vessel 700 as a whole. Such device(s) and/or component(s) are operable and/or usable from their respective position(s) within the open central region of the first electric motor 704 and/or the open central region of the second electric motor 708, and remain so even while the rotor 716 of the first electric motor 704 and/or the rotor 720 of the second electric motor 708 is/are rotating (e.g., while the marine vessel 700 is being propelled within the underwater environment 702 via the first propeller blades 706 and/or the second propeller blades 710).

The following paragraphs provide various examples in relation to the disclosed vehicles equipped with an electric motor including an open central region configured to enable release and/or operation of one or more device(s) from within the electric motor.

Example 1 is a rotor assembly for a rotor-based aerial vehicle. In Example 1, the rotor assembly comprises an electric motor including a stator, a rotor, and an open central region. The rotor is configured to rotate relative to the stator. The open central region is located radially inward relative to the stator. In Example 1, the rotor assembly further comprises a plurality of rotor blades operatively coupled to the rotor. In Example 1, the rotor assembly further comprises a device deployable from a stowed position relative to the electric motor into a deployed position relative to the electric motor. At least a portion of the device is located within the open central region when the device is in the stowed position. The at least a portion of the device is located above the electric motor and above the plurality of rotor blades when the device is in the deployed position.

Example 2 includes the rotor assembly of Example 1. In Example 2, the electric motor is configured as an outer-rotor electric motor in which the rotor circumscribes the stator.

Example 3 includes the rotor assembly of Example 1. In Example 3, the device does not interfere with the plurality of rotor blades when the device is in the deployed position.

Example 4 includes the rotor assembly of Example 1. In Example 4, the rotor assembly further comprises a container located within the open central region. The container includes an exterior surface spaced radially inward from an interior surface of the stator such that an air gap is formed therebetween. The at least a portion of the device is located within the container prior to deployment of the device from the stowed position into the deployed position.

Example 5 includes the rotor assembly of Example 4. In Example 5, the air gap facilitates cooling of the electric motor during use of the electric motor.

Example 6 includes the rotor assembly of Example 1. In Example 6, the device is a parachute.

Example 7 includes the rotor assembly of Example 1. In Example 7, the device is a camera, a weather balloon, a radar system, a measurement device, a sensor device, a weapon system, or a thermal masking assembly.

Example 8 is a rotor assembly for a rotor-based aerial vehicle. In Example 8, the rotor assembly comprises an electric motor including a stator, a rotor, and an open central region. The rotor is configured to rotate relative to the stator. The open central region is located radially inward relative to the stator. In Example 8, the rotor assembly further comprises a plurality of rotor blades operatively coupled to the rotor. Each one of the plurality of rotor blades is pivotable relative to the rotor. In Example 8, the rotor assembly further comprises a control shaft extending through the open central region. The control shaft is configured to move along an axial direction relative to the rotor. In Example 8, the rotor assembly further comprises a plurality of control arms. Each one of the plurality of control arms is operatively coupled to the control shaft and further operatively coupled to a corresponding one of the plurality of rotor blades. Movement of the control shaft along the axial direction relative to the rotor causes a pivotal movement of each one of the plurality of rotor blades relative to the rotor.

Example 9 includes the rotor assembly of Example 8. In Example 9, the electric motor is configured as an outer-rotor electric motor in which the rotor circumscribes the stator.

Example 10 includes the rotor assembly of Example 8. In Example 10, an angle of each one of the plurality of rotor blades relative to the rotor is adjustable via the movement of the control shaft along the axial direction.

Example 11 includes the rotor assembly of Example 10. In Example 11, adjustment of the angle of each one of the plurality of rotor blades relative to the rotor enables the rotor assembly to adjust one or more flight-related aerodynamic characteristics associated with the plurality of rotor blades.

Example 12 includes the rotor assembly of Example 11. In Example 12, the one or more flight-related aerodynamic characteristics include lift, thrust, angle of attack, and pitch angle.

Example 13 is a marine vessel. In Example 13, the marine vessel comprises an electric motor including a stator, a rotor, and an open central region. The rotor is configured to rotate relative to the stator. The rotor has an exterior surface. The open central region is located radially inward relative to the stator. In Example 13, the marine vessel further comprises a plurality of propeller blades operatively coupled to the rotor. Each one of the plurality of propeller blades extends radially outward from the exterior surface of the rotor and also projects radially outward relative to a surrounding portion of an exterior surface of a longitudinal body of the marine vessel. Rotational movement of the rotor causes a corresponding rotational movement of the plurality of propeller blades, thereby causing the marine vessel to be propelled within an underwater environment. In Example 13, the marine vessel further comprises a device or a component located at least partially within the open central region. The device or the component is operable or usable from within the open central region while the rotor is rotating and the marine vessel is being propelled within the underwater environment.

Example 14 includes the marine vessel of Example 13. In Example 14, the marine vessel further comprises a plurality of tail fins configured to assist with stability and control of the marine vessel as the marine vessel is propelled within the underwater environment.

Example 15 includes the marine vessel of Example 13. In Example 15, the electric motor is configured as an outer-rotor electric motor in which the rotor circumscribes the stator.

Example 16 includes the marine vessel of Example 13. In Example 16, the exterior surface of the rotor is substantially flush with the exterior surface of the surrounding portion of the longitudinal body of the marine vessel.

Example 17 includes the marine vessel of Example 13. In Example 17, the electric motor is a first electric motor, the stator is a first stator, the rotor is a first rotor, the open central region is a first open central region, and the plurality of propeller blades is a first plurality of propeller blades. In Example 17, the marine vessel further comprises a second electric motor axially spaced apart from the first electric motor along the longitudinal body of the marine vessel. The second electric motor includes a second stator, a second rotor, and a second open central region. The second rotor is configured to rotate relative to the second stator. The second rotor has an exterior surface. The second open central region is located radially inward relative to the second stator. In Example 17, the marine vessel further comprises a second plurality of propeller blades operatively coupled to the second rotor. Each one of the second plurality of propeller blades extends radially outward from the exterior surface of the second rotor and also projects radially outward relative to a surrounding portion of the exterior surface of the longitudinal body of the marine vessel. Rotational movement of the second rotor causes a corresponding rotational movement of the second plurality of propeller blades, thereby causing the marine vessel to be propelled within the underwater environment.

Example 18 includes the marine vessel of Example 17. In Example 18, the first electric motor and the second electric motor are independently operable.

Example 19 includes the marine vessel of Example 17. In Example 19, the device or the component is a first device or a first component. In Example 19, the marine vessel further comprises a second device or a second component located at least partially within the second open central region. The second device or the second component is operable or usable from within the second open central region while the second rotor is rotating and the marine vessel is being propelled within the underwater environment.

Example 20 includes the marine vessel of Example 17. In Example 20, the marine vessel further comprises a tail rudder including a plurality of adjustable fins configured to assist with stability and control of the marine vessel as the marine vessel is propelled within the underwater environment.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A rotor assembly for a rotor-based aerial vehicle, the rotor assembly comprising:

an electric motor including a stator, a rotor, and an open central region, the rotor configured to rotate relative to the stator, the open central region located between upper and lower axial boundaries of the electric motor at a position radially inward of the stator;

a plurality of rotor blades operatively coupled to the rotor; and a device deployable from a stowed position relative to the electric motor into a deployed position relative to the electric motor, wherein at least a portion of the device is located within the open central region when the device is in the stowed position, wherein the at least a portion of the device is located above the electric motor and above the plurality of rotor blades when the device is in the deployed position.

2. The rotor assembly of claim 1, wherein the electric motor is configured as an outer-rotor electric motor in which the rotor circumscribes the stator.

3. The rotor assembly of claim 1, wherein the device does not interfere with the plurality of rotor blades when the device is in the deployed position.

4. The rotor assembly of claim 1, further comprising a container located within the open central region, the container including an exterior surface spaced radially inward from an interior surface of the stator such that an air gap is formed therebetween, wherein the at least a portion of the device is located within the container prior to deployment of the device from the stowed position into the deployed position.

5. The rotor assembly of claim 4, wherein the air gap facilitates cooling of the electric motor during use of the electric motor.

6. The rotor assembly of claim 1, wherein the device is a parachute.

7. The rotor assembly of claim 1, wherein the device is a camera, a weather balloon, a radar system, a measurement device, a sensor device, a weapon system, or a thermal masking assembly.

8. The rotor assembly of claim 1, wherein the device is a camera.

9. The rotor assembly of claim 1, wherein the device is a weather balloon.

10. The rotor assembly of claim 1, wherein the device is a radar system.

11. The rotor assembly of claim 1, wherein the device is a measurement device.

12. The rotor assembly of claim 1, wherein the device is a sensor device.

13. The rotor assembly of claim 1, wherein the device is a weapon system.

14. The rotor assembly of claim 1, wherein the device is a thermal masking assembly.

15. A rotor assembly for a rotor-based aerial vehicle, the rotor assembly comprising:

an electric motor including a stator, a rotor, and an open central region, the rotor configured to rotate relative to the stator, the rotor circumscribing the stator, the open central region located between upper and lower axial boundaries of the electric motor at a position radially inward of the stator;

a plurality of rotor blades operatively coupled to the rotor; and a parachute deployable from a stowed position relative to the electric motor into a deployed position relative to the electric motor, wherein at least a portion of the parachute is located within the open central region when the parachute is in the stowed position, wherein the at least a portion of the parachute is located above the electric motor and above the plurality of rotor blades when the parachute is in the deployed position, wherein the parachute does not interfere with the plurality of rotor blades when the parachute is in the deployed position.

16. The rotor assembly of claim 15, further comprising a container located within the open central region, the container including an exterior surface spaced radially inward from an interior surface of the stator such that an air gap is formed therebetween, wherein the at least a portion of the parachute is located within the container prior to deployment of the parachute from the stowed position into the deployed position.

17. The rotor assembly of claim 16, wherein the air gap facilitates cooling of the electric motor during use of the electric motor.

* * * * *